United States Patent
Linde et al.

(10) Patent No.: US 11,618,215 B2
(45) Date of Patent: Apr. 4, 2023

(54) METHOD FOR MANUFACTURING A FUSELAGE COMPONENT FOR AN AIRCRAFT, FUSELAGE COMPONENT FOR AN AIRCRAFT AND AIRCRAFT

(71) Applicant: Airbus Operations GmbH, Hamburg (DE)

(72) Inventors: Peter Linde, Hamburg (DE); Norbert Heltsch, Hamburg (DE)

(73) Assignee: Airbus Operations GmbH

( * ) Notice: Subject to any disclaimer, the term of this patent is extended or adjusted under 35 U.S.C. 154(b) by 155 days.

(21) Appl. No.: 16/555,302

(22) Filed: Aug. 29, 2019

(65) Prior Publication Data
US 2020/0079013 A1    Mar. 12, 2020

(30) Foreign Application Priority Data

Sep. 10, 2018  (DE) ...................... 10 2018 215 356.6

(51) Int. Cl.
| | |
|---|---|
| B29C 64/165 | (2017.01) |
| B33Y 10/00 | (2015.01) |
| B33Y 80/00 | (2015.01) |
| B29C 64/118 | (2017.01) |
| B29C 70/38 | (2006.01) |
| B33Y 70/10 | (2020.01) |
| B29L 31/30 | (2006.01) |
| B29K 101/12 | (2006.01) |

(52) U.S. Cl.
CPC .......... *B29C 64/165* (2017.08); *B29C 64/118* (2017.08); *B29C 70/38* (2013.01); *B33Y 10/00* (2014.12); *B33Y 70/10* (2020.01); *B33Y 80/00* (2014.12); *B29K 2101/12* (2013.01); *B29L 2031/3082* (2013.01)

(58) Field of Classification Search
CPC ..... B29C 64/165; B29C 64/118; B29C 70/38; B33Y 10/00; B29K 2101/12; Y02T 50/40
USPC ........................................................ 264/308
See application file for complete search history.

(56) References Cited

U.S. PATENT DOCUMENTS

| | | | |
|---|---|---|---|
| 2013/0337207 A1 | 12/2013 | Mueller et al. | |
| 2014/0186586 A1* | 7/2014 | Victorazzo | B64C 1/061 |
| | | | 428/167 |

(Continued)

FOREIGN PATENT DOCUMENTS

| | | |
|---|---|---|
| DE | 10 2006 048 668 A1 | 4/2008 |
| DE | 10 2009 057 006 A1 | 6/2011 |

(Continued)

*Primary Examiner* — Leith S Shafi
*Assistant Examiner* — Xinwen Ye
(74) *Attorney, Agent, or Firm* — Lerner, David, Littenberg, Krumholz & Mentlik, LLP

(57) ABSTRACT

A method for manufacturing a fuselage component for an aircraft includes building up, on a surface of a two-dimensional shell part composed of a fibre composite material, stiffening profiles crossing at an intersection from a plurality of layers, superimposed on one another in a thickness direction, which are each formed by applying filaments, which each comprise a fibre bundle embedded in a thermoplastic material. Stabilising layers, within which the filaments extend beyond the intersection, are formed from the filaments in each of the stiffening profiles. A fuselage component and an aircraft, which comprises at least one such fuselage component, are furthermore described.

8 Claims, 5 Drawing Sheets

(56) References Cited

U.S. PATENT DOCUMENTS

| | | |
|---|---|---|
| 2015/0136908 A1 | 5/2015 | Hegenbart et al. |
| 2015/0165666 A1 | 6/2015 | Butcher et al. |
| 2018/0117841 A1* | 5/2018 | Tyler .................. B32B 3/12 |

FOREIGN PATENT DOCUMENTS

| | | | |
|---|---|---|---|
| DE | 102012210043 | A1 | 12/2013 |
| EP | 2801512 | A1 | 11/2014 |
| EP | 3130444 | A1 | 2/2017 |
| FR | 3 025 491 | A1 | 3/2016 |
| WO | 2012062441 | A2 | 5/2012 |
| WO | 2018078501 | A2 | 5/2018 |

* cited by examiner

METHOD FOR MANUFACTURING A FUSELAGE COMPONENT FOR AN AIRCRAFT, FUSELAGE COMPONENT FOR AN AIRCRAFT AND AIRCRAFT

FIELD OF THE INVENTION

The present invention relates to a method for manufacturing a fuselage component for an aircraft, a fuselage component for an aircraft and an aircraft.

BACKGROUND OF THE INVENTION

Shell-shaped components composed of a fibre composite material are often used for the manufacture of a fuselage structure of an aircraft. These components typically comprise a two-dimensional shell part or skin element together with stiffening profiles, which are connected to the shell part and form a latticed stiffening structure. Here both the shell part and also the stiffening profiles are mostly formed from a fibre composite material.

For manufacturing such components DE 10 2009 057 006 A1 proposes a method in which strip elements of a fibrous material are laid in grooves formed on a mould part, the grooves running in a pattern corresponding to a latticed form of the stiffening structure to be produced. The respective strip elements terminate at groove intersections at each of which two grooves intersect and a crossing piece connecting the respective strip elements is inserted. A two-dimensional semi-finished fibre product is formed on the mould part, for example by laying fibre tapes by means of an AFP ("automated fibre placement") process. A pressure plate is then applied to the semi-finished fibre product, and the semi-finished fibre product and the strip elements are infiltrated with a matrix material, which is then cured.

US 2015/0136908 A1 describes a frame structure for an aircraft access door. The frame structure is formed by a number of support members surrounding the access door and running in intersecting directions. The support members are interconnected by a cruciform connecting piece in the area of a door corner.

DE 10 2006 048 668 A1 describes a method for manufacturing structural components having a two-dimensional skin and a stiffening structure applied to the skin, the stiffening structure comprising at least two stiffening profiles composed of a fibre composite material and having a common intersection. Here the stiffening profiles are draped on the skin, forming transitional surfaces, which are designed so as to allow a continuous arrangement of stiffening fibres suited to the flux of the lines of force.

FR 3 025 491 A1 furthermore describes a fuselage component for an aircraft, in which a stiffening structure is produced on a two-dimensional shell part by an additive manufacturing process.

BRIEF SUMMARY OF THE INVENTION

Aspects of the present invention may provide an improved fuselage component and a method for manufacturing a fuselage component, which can be performed efficiently and which endows the fuselage component with a high mechanical strength.

According to a first aspect of the invention, a method is provided for manufacturing a fuselage component for an aircraft. In a first step of the method a two-dimensional shell part composed of a fibre composite material is provided. The shell part may be a lamellar component, for example, which optionally has a curved profile. On one surface of the shell part a first stiffening profile is built up from a plurality of first layers superimposed on one another in a thickness direction, which are each formed by applying filaments, which each comprise a fibre bundle embedded in a thermoplastic material. A second stiffening profile crossing the first stiffening profile at an intersection is furthermore built up on the surface of the shell part. Like the first stiffening profile, the second stiffening profile is built up from a plurality of second layers superimposed on one another in the thickness direction, which are formed by applying filaments, which each comprise a fibre bundle embedded in a thermoplastic material. In the first stiffening profile and in the second stiffening profile, stabilising layers, within which the filaments extend beyond the intersection, are in each case formed from the filaments.

An underlying concept of the invention is to produce a stiffening structure from intersecting stiffening profiles by means of a special additive or generative manufacturing process, in which individual layers of the stiffening profiles are each produced from a plurality of filaments, which each comprise a fibre bundle embedded in a thermoplastic matrix material. The filaments here are applied to the surface of the shell part whilst the matrix material is in a thermoplastic state. Applying individual filaments affords the advantage that in each of the intersecting stiffening profiles separate stabilising layers can be formed having continuous reinforcing fibres extending beyond the crossing point or the intersection. This leads to a high mechanical rigidity of the stiffening structure. Since both stiffening profiles are each formed from filaments which each comprise a fibre bundle embedded in thermoplastic matrix material, a cohesive material connection is produced between the stiffening profiles, so that the transmission of force between the profiles is improved, which further increases the mechanical strength. The build-up of the individual stiffening profiles directly on the surface of the shell part speeds up the process and reduces the overall manufacturing outlay.

According to one embodiment of the method the filaments are applied by means of a pressure head, from which the thermoplastic material is extruded in a thermoplastic state coaxially with the fibre bundle. For example, the pressure head may have a central aperture, through which the fibre bundle is fed, and a slot which concentrically surrounds the central aperture and from which the thermoplastic matrix material is extruded. In this way the fibre bundle, which may comprise one or more reinforcing fibre filaments, is reliably and fully embedded in matrix material.

The thermoplastic material and the fibre bundle may each be fed to the pressure head as ribbon-shaped or filamentary material.

According to a further embodiment the filaments of the stabilising layers are each applied over an entire longitudinal extent of the stiffening profiles. Accordingly, filaments are applied which extend continuously from a first end of the respective layer to a second end of the respective layer, at least in each of the first and second layers forming the stabilising layers. Continuous fibre bundles are thereby provided in the layers, which further improves the force flux inside the stiffening profiles. This can be done efficiently by applying individual filaments.

According to a further embodiment of the method the second stiffening profile is built up to a greater height in the thickness direction than the first stiffening profile, at least one of the stabilising layers of the second stiffening profile being formed in an area of the second stiffening profile situated above the first stiffening profile in the thickness direction. In other words, at least one of the stabilising layers of the second stiffening profile in the thickness direction is applied over a first layer defining a height of the first stiffening profile in the thickness direction. As a result, a stabilising web which extends beyond the first stiffening profile and which comprises one or more stabilising layers, can be formed as part of the second stiffening profile.

According to a further embodiment the first layers of the first stiffening profile and the second layers of the second stiffening profile in the thickness direction are each formed alternately as stabilising layer. Accordingly, a layer serving as stabilising layer and a layer serving as uninterrupted layer at the intersection are therefore each formed alternately in the thickness direction. In this way stabilising layers can be provided over the entire extent of the respective stiffening profile in the thickness direction, thereby further improving the mechanical stability.

According to a further embodiment the first stiffening profile and/or the second stiffening profile is formed with a T-shaped, an I-shaped or an Ω-shaped cross section. The layered formation of the stiffening profiles through individual filaments is a very simple way of achieving complex cross-sectional shapes. Furthermore, it is easily possible to provide continuous stabilising layers even in the case of undercut cross sections such as Ω-shaped cross sections, for example.

According to a further embodiment the shell part comprises a thermoplastic matrix material. Accordingly, the reinforcing fibres of the shell part are embedded in a thermoplastic matrix material. The matrix material of the shell part may optionally be identical to that of the filaments. The provision of a shell part with a thermoplastic matrix material has the advantage that it is particularly easy to form a materially cohesive connection between the filaments forming the layers of the stiffening profiles and the shell part affording high mechanical stability.

According to a further aspect of the invention a fuselage component is provided for an aircraft. The fuselage component may, in particular, be manufactured by the method according to the invention. The aforementioned advantages and features therefore also apply to the fuselage component as disclosed. The fuselage component according to the invention comprises a two-dimensional shell part composed of a fibre composite material, a first stiffening profile which is connected to a surface of the shell part and which comprises a plurality of first layers of fibre bundles, which are embedded in a thermoplastic matrix material, and a second stiffening profile which is connected to the surface of the shell part and crosses the first stiffening profile at an intersection, and which comprises a plurality of second layers of fibre bundles, which are embedded in a thermoplastic matrix material. The first and the second stiffening profiles are connected by a cohesive material connection and each comprise stabilising layers, within which the fibre bundles extend beyond the intersection.

According to a further aspect of the invention an aircraft is provided with at least one fuselage component which is formed as described above. The fuselage component may form an outer skin of a fuselage of the aircraft, for example. The first stiffening profile may, in particular, form a stringer extending in a longitudinal direction of an aircraft. The second stiffening profile may, in particular, form a rib.

A "fibre composite material" or a "fibre-reinforced material" is here generally taken to mean a material which comprises a fibrous material, which is formed from a plurality of, in particular, filamentary or truncated filamentary reinforcing fibres, such as, for example, carbon, glass, ceramic, aramid, boron, mineral, natural or plastic fibres or mixtures thereof, the fibrous material being embedded in a resin or matrix material, such as a thermoplastic resin or a plastic resin in general or the like.

With regard to specified directions and axes, in particular specified directions and axes which relate to the course of physical structures, a course of an axis, a direction or a structure "along" another axis, direction or structure is here taken to mean that these, in particular the tangents resulting in a respective position of the structures, in each case run at an angle of less than 45 degrees, preferably less than 30 degrees and more preferably parallel to one another.

With regard to specified directions and axes, in particular specified directions and axes which relate to the course of physical structures, a course of an axis, a direction or a structure "transversely" to another axis, direction or structure is here taken to mean that these, in particular the tangents resulting in a respective position of the structures, in each case run at an angle of more than or equal to 45 degrees, preferably more than or equal to 60 degrees and more preferably perpendicular to one another.

BRIEF DESCRIPTION OF THE DRAWINGS

The invention is explained below, referring to the figures of the drawings, of which.

Figure 1:
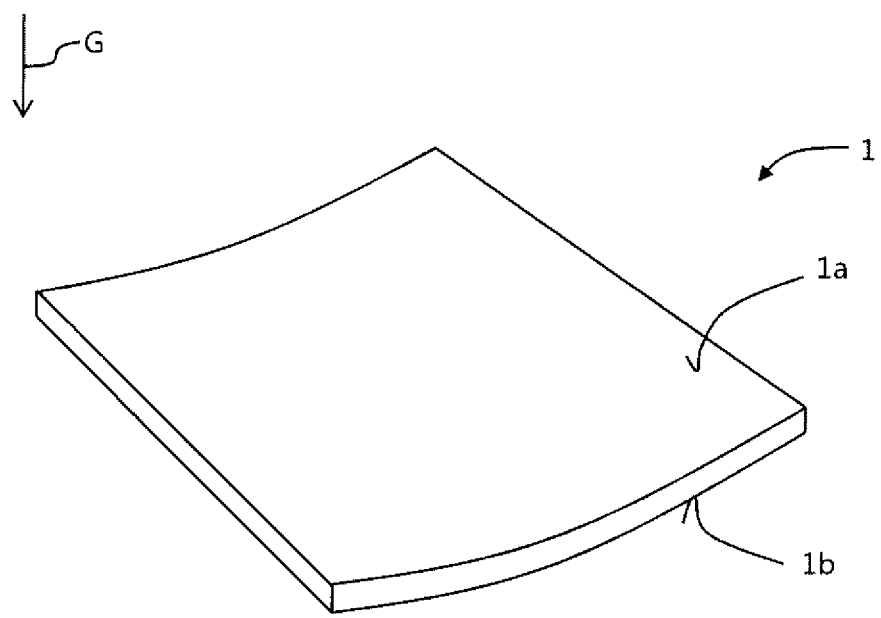
FIG. 1 shows a perspective view of a first surface of a shell part for performing a method according to one exemplary embodiment of the present invention.

Unless otherwise specified, the reference numerals in the figures denote the same or functionally equivalent components.

DETAILED DESCRIPTION

Figure 11:
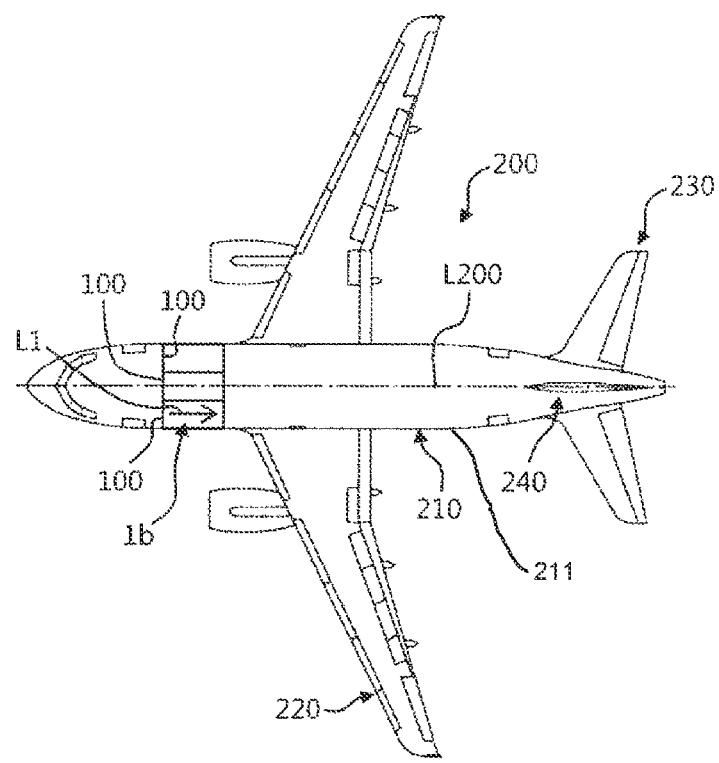
FIG. 11 shows a schematic view of an aircraft according to one exemplary embodiment of the present invention.

FIG. 11 by way of example shows an aircraft 200, which comprises a fuselage 210, wings 220 extending out therefrom, an elevator assembly 230 arranged at one end of the fuselage 210 and a tailfin assembly 240 likewise arranged at the end of the fuselage 210. The fuselage 210 is of tubular construction and defines an aircraft longitudinal axis L200. An outer skin 211 of the fuselage 210 is formed by fuselage components 100, which are arranged contiguous with one another in a circumferential direction of the fuselage 210.

Figure 6:
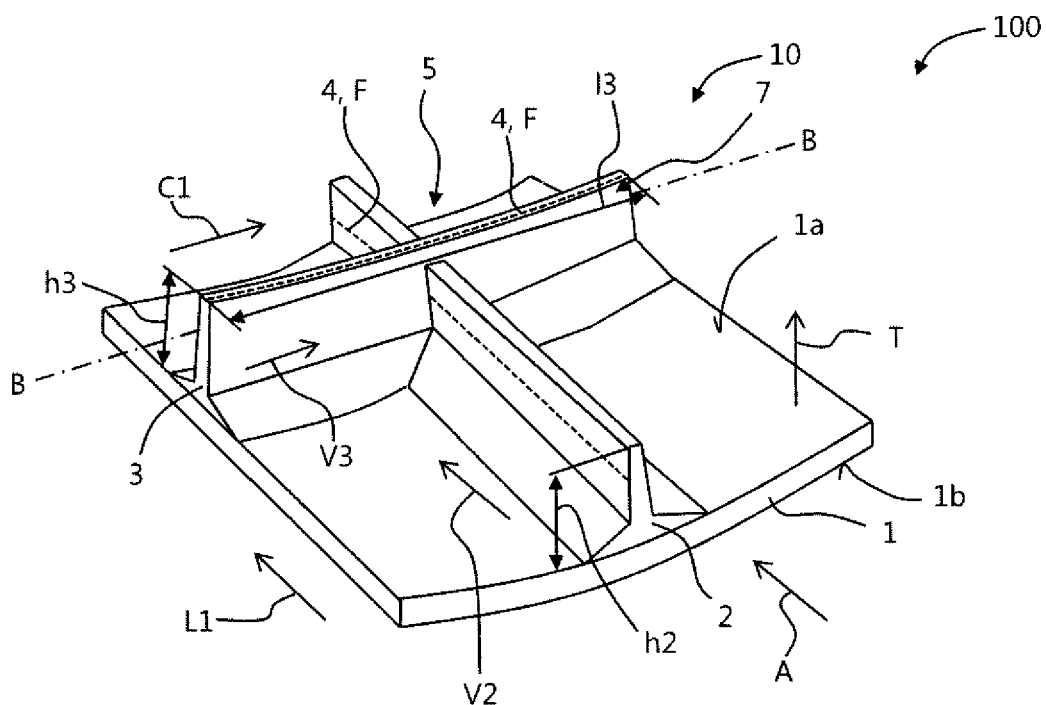
FIG. 6 shows a perspective view of a fuselage component according to one exemplary embodiment of the present invention.

FIG. 6 by way of example shows a fuselage component 100. This comprises a shell part 1 and a stiffening structure 10 having at least a first stiffening profile 2 and at least a second stiffening profile 3.

As is represented schematically in FIG. 6, the shell part 1 is formed as a two-dimensional component. The shell part 1 may, in particular, be formed as an arched body. Here an "arched body" is generally taken to mean a body or a component which has at least a first surface and a second surface oriented in the opposite direction to the former, the first and/or the second surface each running curved in at least one direction. The shell part 1 has a first surface 1a and a second surface 1b opposed to the former. In the case of the shell part 1 shown by way of example in FIG. 6, the first surface 1a is concavely curved and the second surface 1b is convexly curved. The second surface 1b is intended to form an outer surface of the fuselage 210 of the aircraft 200.

The shell part 1 is formed from a fibre composite material, for example a fibre composite material which comprises a thermoplastic matrix material.

As shown in FIG. 6, the first and the second stiffening profile 2, 3 are each affixed to the first surface 1a and each protrude from the first surface 1a in a thickness direction T. The first stiffening profile 2 extends in a first stiffening longitudinal direction V2, the first stiffening profile 2 with the first stiffening longitudinal direction V2 running in a component longitudinal direction L1. The second stiffening profile 3 extends in a second stiffening longitudinal direction V3, the second stiffening profile 3 with the second stiffening longitudinal direction V3 running in a component transverse direction C1 and crossing the first stiffening profile 2 at an intersection 5. As represented by way of example in FIG. 6, the first and the second stiffening profile 2, 3 may each have an T-shaped cross section. Other cross-sectional shapes may obviously also be provided. Thus FIG. 9 by way of example shows a fuselage component 100 in which the first stiffening profile 2 has an I-shaped cross section. FIG. 10 by way of example shows a fuselage component 100 in which the first stiffening profile 2 has an Ω-shaped cross section. The first and second stiffening profiles 2, 3 may have the same or different cross-sectional shapes.

The first stiffening profile 2 may, in particular, form a stringer, which extends along the aircraft longitudinal axis L200 when the fuselage component 100 is fitted in an aircraft 200, as is represented in FIG. 11, for example. The second stiffening profile 3 preferably forms a rib extending in the circumferential direction of the fuselage 210.

The first and the second stiffening profiles 2, 3 are each built up from a plurality of layers 20, 30 of fibre bundles F, which are embedded in a thermoplastic matrix material P. This is indicated only symbolically in FIG. 6 by representing individual fibre bundles F as dashed lines. The first and the second stiffening profiles 2, 3 are connected to one another by a cohesive material connection in the area of the intersection 5. In particular, each of the stiffening profiles 2, 3 comprises stabilising layers 41, 42, within which the fibre bundles F extend beyond the intersection 5. These layers of continuous fibre bundles F, which may each contain one or more fibre filaments, serve, in particular, to improve the mechanical rigidity of the fuselage component 100. For a specified rigidity, the stiffening structure 10 can thereby be formed with reinforcing profiles 2, 3 of smaller cross section, thereby reducing the weight of the stiffening structure 10.

The manufacture of the fuselage component 100 is explained below referring to FIGS. 1 to 8.

As represented by way of example in FIG. 1, the shell part 1 is first assembled. The shell part 1 is preferably arranged on a mount (not shown) so that the first surface 1a faces upwards in the direction of gravitational force G.

A building-up of the first and of the second stiffening profiles 2, 3 is represented schematically by way of example in the FIGS. 2 to 6. The stiffening profiles 2, 3 are built up in layers in a thickness direction T extending transversely to the first surface 1a. That is to say each stiffening profile 2, 3 is formed by the successive application of individual layers 20, 30, the individual layers 20, 30 being formed one on top of another in the thickness direction T.

Figure 2:
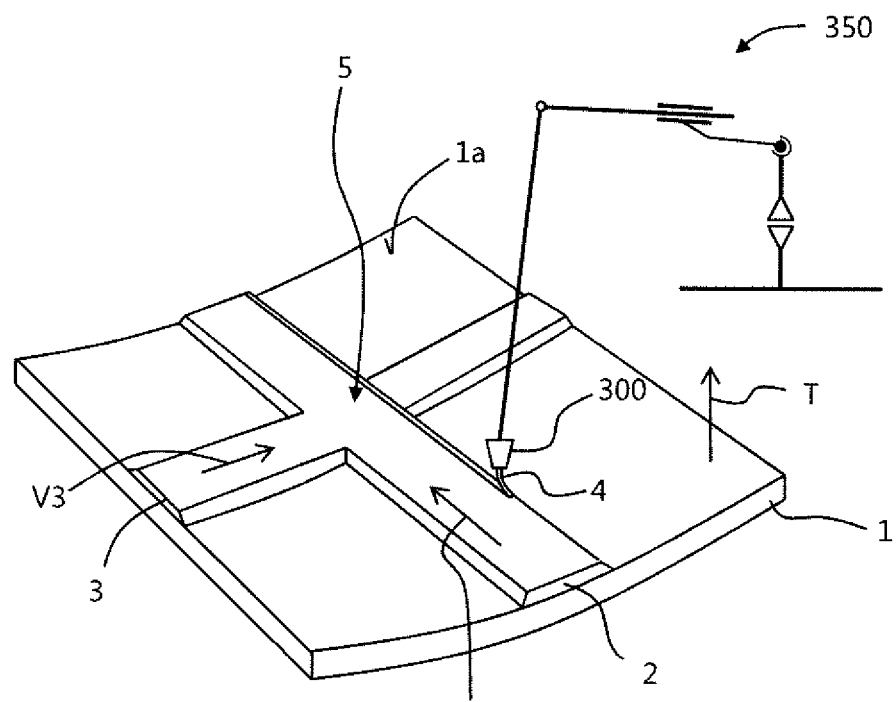
FIG. 2 shows a perspective view of the shell part in FIG. 1 during the building-up of a first and a second stiffening profile on the first surface of the shell part by a method according to one exemplary embodiment of the present invention.

As is represented schematically in FIG. 2, each layer 20, 30 is formed by applying individual filaments 4. In particular, one layer 20, 30 at a time is formed by a plurality of individual filaments 4, by applying or laying these filaments 4 simultaneously or successively side-by-side onto the first surface 1a or the layer 20, 30 already formed thereon. The filaments 4 each comprise a fibre bundle F embedded in a thermoplastic material P. The thermoplastic material P is in a plastically deformable or thermoplastic state during the application process. A cohesive material connection is thereby achieved with the adjacent filaments 4 and the surface 1a of the shell part 1. As is represented schematically in FIG. 2, the application of the filaments 4 may be performed by means of a pressure head 300, which is moved along the first surface 1a of the shell part 1 by means of a moving device 350. The moving device 350 may take the form, for example, of a manipulator of a robot, as is represented schematically in FIG. 2. A high degree of automation of the manufacturing process can therefore be achieved. For controlling a moving path of the pressure head 300 guided by the moving device 350, a control device (not shown) may be provided, which is set up to control the moving device 350 in such a way that this moves the pressure head 300 according to the cross-sectional shape of the stiffening profiles 2, 3 to be produced. On the basis of a digitalized geometric pattern of the stiffening profiles 2, 3, which may be filed in a memory of the control device, for example, filaments 4 are therefore sequentially superimposed in layers and solidify in this position.

Figure 3:
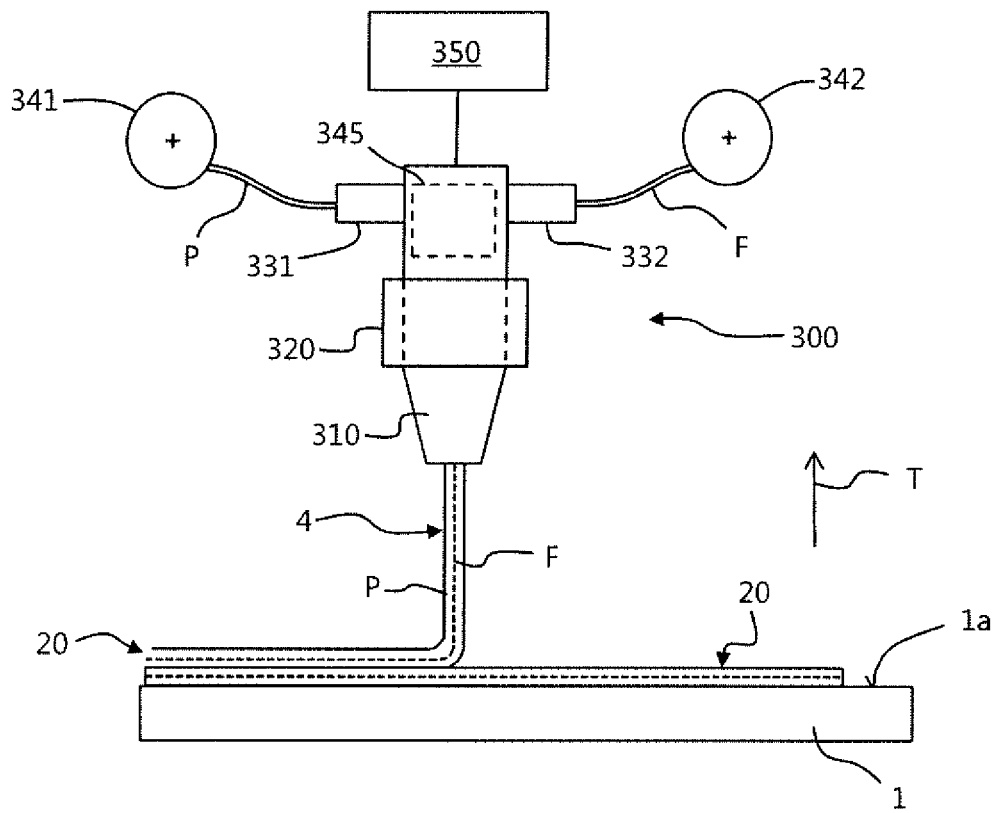
FIG. 3 shows a schematic sectional view of the shell part during the formation of a layer of a stiffening profile by filaments by a method according to one exemplary embodiment of the present invention.
Figure 4:
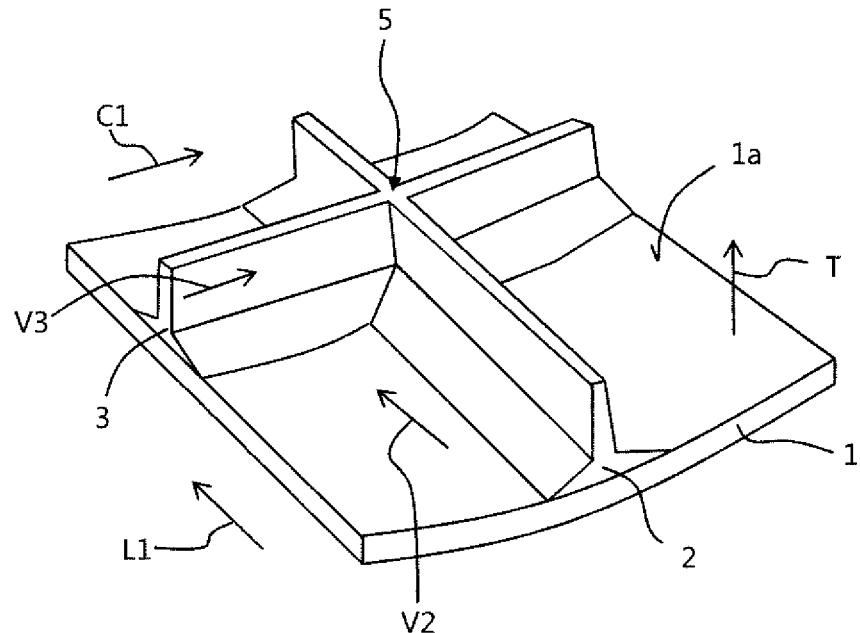
FIG. 4 shows a perspective view of the shell part during the building-up of the first and the second stiffening profile by a method according to one exemplary embodiment of the present invention.

FIG. 3 schematically shows the application of a filament 4 for forming a layer 20 of the first stiffening profile 2 by means of a pressure head 300. The moving device 350 in FIG. 3 is represented only symbolically by a block. As can be seen in FIG. 3, a bottommost layer 20 in the thickness direction T has already been formed directly on the first surface 1a of the shell part 1. FIG. 3 schematically shows that in order to form a further layer 20 on the bottommost layer 20 already present a filament 4 is extruded from the pressure head 300. In doing this, for example, the thermoplastic material P may be extruded in a thermoplastic state coaxially with the fibre bundle F. The pressure head 300 shown by way of example in FIG. 3 comprises a nozzle 310 having a central aperture (not shown), from which the fibre bundle F is extruded, and a slot (not shown), from which the thermoplastic material P is extruded, coaxially surrounding the central aperture. The pressure head 300 further comprises a heating device 320 enclosing the nozzle 310, in order to melt on the thermoplastic material P. At an opposite end of the nozzle 310 to the central aperture (not shown), feed portions 331, 332 are formed, through which the thermoplastic material P and the fibre bundle F are fed. The thermoplastic material P and the fibre bundle F may each be fed to the pressure head 300, for example through the feed portions 331, 332, as either ribbon-shaped or filamentary material, as is represented schematically in FIG. 3. For this purpose, the thermoplastic material P and the fibre bundle F may each be reeled off from a reel or spool 341, 342, for example. A cooling device 345 may optionally be arranged in the area of the feed portions 331, 332, in order to prevent the thermoplastic material P melting whilst it is still being fed.

As a comparison of FIGS. 2, 4, 5 and 6 shows, the cross-sectional shape of the stiffening profiles 2, 3 is built up successively in the thickness direction T.

Figure 5:
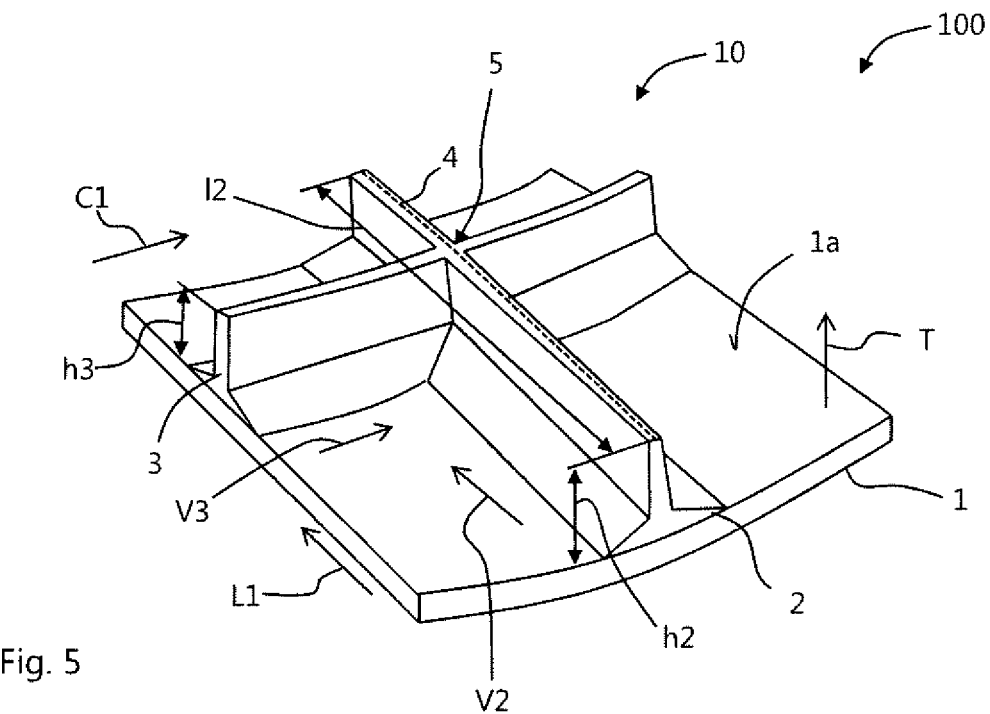
FIG. 5 shows a perspective view of the shell part during the building-up of the first and the second stiffening profile by a method according to one exemplary embodiment of the present invention.

As shown in FIG. 5, the first stiffening profile 2 and the second stiffening profile 3 may each be built up to the same height h2, h3 in the thickness direction T. The second stiffening profile 3 may optionally be built up to a height h3, which is greater than the height h2 of the first stiffening profiles 2, as is represented by way of example in FIG. 6.

Figure 7:
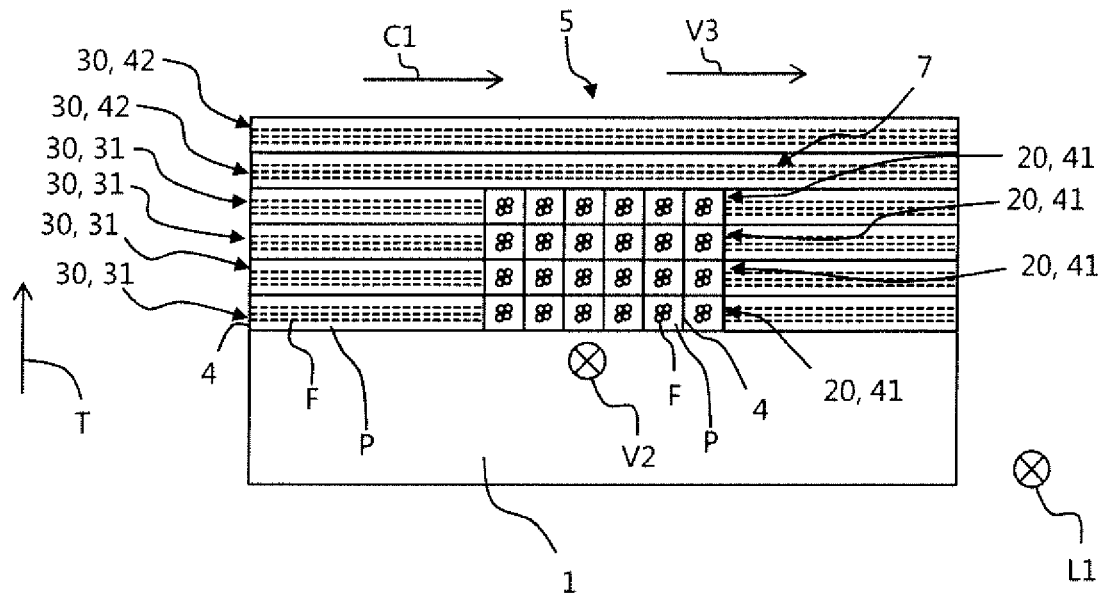
FIG. 7 shows an enlarged, schematic sectional view of the area of an intersection of the fuselage component according to one exemplary embodiment, which results from a section along the line B-B drawn in FIG. 6.
Figure 8:
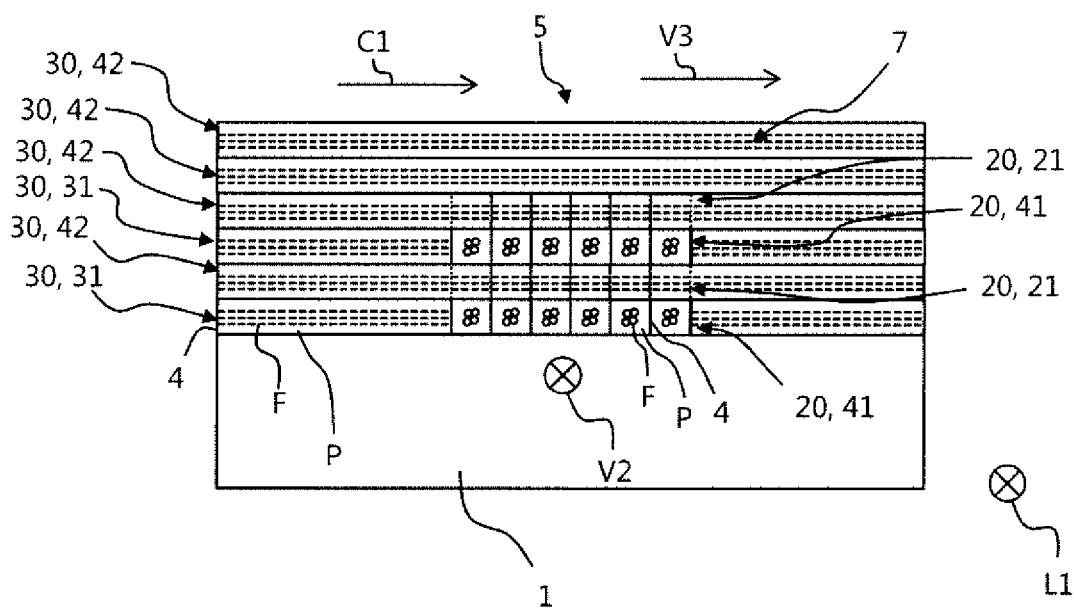
FIG. 8 shows an enlarged, schematic sectional view of the area of an intersection of the fuselage component according to a further exemplary embodiment, which results from a section along the line B-B drawn in FIG. 6.

FIGS. 7 and 8 show a schematic sectional view of the intersection 5. The individual filaments 4 are here represented purely by way of example as rectangular and comprise—likewise purely by way of example—fibre bundles F having four fibre filaments. It should be noted that the individual filaments 4 fuse together and in FIGS. 7 and 8 are therefore shown only for the purposes of explanation.

FIG. 7 shows by way of example that the filaments 4 of the layers 20 of the first stiffening profile 2 have been applied in the first stiffening longitudinal direction V2. In particular, in FIG. 7 the filaments 4 of the layers 20 of the first stiffening profile 2 extend beyond the intersection 5 and thereby form stabilising layers 41. The second stiffening profile 3 likewise comprises stabilising layers 42, which extend beyond the intersection 5. In addition, the second stiffening profile 3 comprises substrate layers 31, the filaments 4 of which extend up to the layers 20 of the first stiffening profile 2 and in the second stiffening longitudinal direction V3 are interrupted in the area of the first stiffening profile 2. Here the respective substrate layers 31 extend up to the layers 20 of the first stiffening profile 2, so that the thermoplastic material P of the substrate layers 31 of the second stiffening profile 3 and the thermoplastic material P of the layers 20 of the first stiffening profile 2 fuse together and thus form a cohesive material connection. As is shown by way of example in FIG. 7, the stabilising layers 42 of the second stiffening profile 3 may be formed in a web-like area 7 of the second stiffening profile 3 situated above the first stiffening profile 2 in the thickness direction T.

FIG. 8 shows by way of example that the layers 20 of the first stiffening profile 2 and the second layers 30 of the second stiffening profile 3 in the thickness direction T are each formed alternately as stabilising layer 41, 42 and as substrate layer 21, 31. The filaments 4 of the substrate layers 21 of the first stiffening profile 2 therefore extend up to a respective stabilising layer 42 of the second stiffening profile 3, and in the first stiffening longitudinal direction V2 are interrupted in the area of the stabilising layer 42 of the second stiffening profile 3. The filaments 4 of the substrate layers 31 of the second stiffening profile 3 therefore extend up to a respective stabilising layer 41 of the first stiffening profile 2, and in the second stiffening longitudinal direction V3 are interrupted in the area of the stabilising layer 41 of the first stiffening profile 2. The filaments 4 of the stabilising layers 41, 42 of the first and of the second stiffening profile 2, 3 in each case extend through the interruption of the filaments 4 of the substrate layers 21, 31 beyond the area of the intersection 5. In addition, a web-like area 7 of the second stiffening profile 3, situated above the first stiffening profile 2 in the thickness direction T, may also be provided, in which stabilising layers 42 of the second stiffening profile 3 are formed.

Generally, stabilising layers 41, 42, within which the filaments 4 extend beyond the intersection 5, are therefore in each case formed from the filaments 4 in the first stiffening profile 2 and in the second stiffening profile 3. That is to say a fibre bundle F of the respective filament 4 extends continuously in the respective stiffening longitudinal direction V2, V3 on both sides of the intersection. The filaments 4 of the stabilising layers 41, 42 are preferably in each case applied over an entire longitudinal extent 12, 13 of the stiffening profiles 2, 3 in the respective stiffening longitudinal direction V2, V3, as is shown by way of example in FIG. 5 for a filament 4 of a stabilising layer 41 of the first reinforcing profile 2 and in FIG. 6 by way of example for a filament 4 of a stabilising layer 42 of the second reinforcing profile 3.

The filaments 4 of a layer 20, 30 may, in particular, be applied so that they extend parallel to one another. Individual layers 20, 30 may optionally be formed, in particular substrate layers 21, 31, in which the filaments 4 extend transversely to the respective stiffening longitudinal direction V2, V3.

Figure 9:
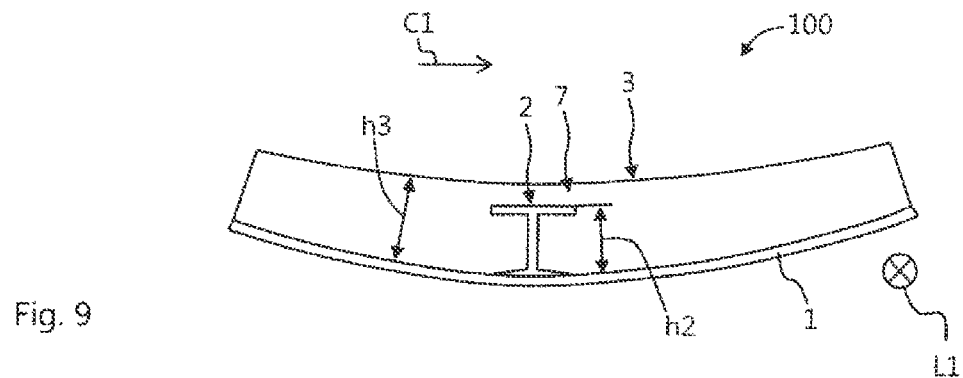
FIG. 9 shows a schematic view of a fuselage component according to a further exemplary embodiment, which results when looking in the direction of the arrow A drawn in FIG. 6.
Figure 10:
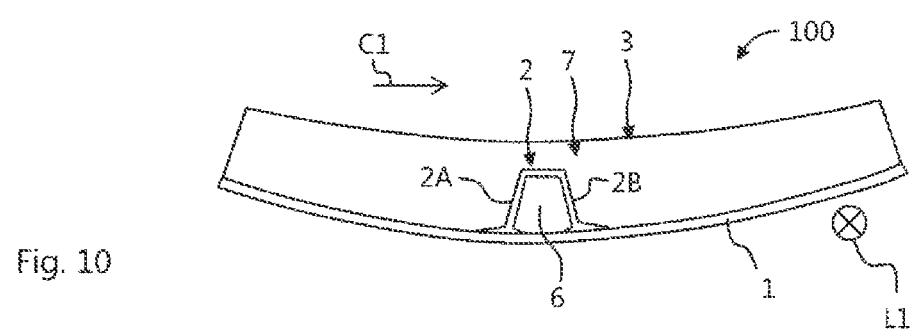
FIG. 10 shows a schematic view of a fuselage component according to a further exemplary embodiment, which results when looking in the direction of the arrow A drawn in FIG. 6.

As can be seen in FIGS. 9 and 10, stiffening profiles 2, 3 with different cross-sectional shapes can be efficiently produced by the generative production of the stiffening profiles 2, 3 through the layered application of individual filaments 4. A further advantage associated with the stiffening profiles 2, 3 of Ω-shaped cross section or undercut or closed cross sections in general is clear from FIG. 9. Through the layered application of individual filaments 4, the second stiffening profile 3 can be continued in an area 6, which is situated between separated side webs 2A, 2B of the first stiffening profile 2, for example through substrate layers 31 and/or as stabilising layers 42. This further improves the mechanical rigidity.

The method described, as can be seen in particular from FIGS. 6, 9 and 10, affords a monolithic configuration of the stiffening structure 10, since the thermoplastic material P of the filaments 4 of the first and of the second reinforcing profile 2, 3 fuses together. Furthermore, the stiffening structure 10 is formed directly on the surface 1a of the shell part 1, and in a way that allows a high degree of automation. This obviates the need for intricate positioning operations for the positioning of separate prefabricated stiffening profiles, which are invested with corresponding component tolerances. This consequently speeds up manufacturing of the fuselage component 100. At the same time, there is a resulting improvement in the mechanical rigidity of the fuselage component 100 due to the monolithic structure of the thermoplastic material P and the continuous fibre bundles F extending beyond the intersection.

Although the present invention has been explained above by way of example with reference to exemplary embodiments, it is not limited to these but can be modified in a variety of ways. In particular, combinations of the exemplary embodiments above are feasible.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS 1 shell part
1a first surface
1b second surface
2 first stiffening profile
3 second stiffening profile
4 filament
5 intersection
6 area
7 web-like area
10 stiffening structure
20 first layers
21 substrate layers of the first stiffening profile
30 second layers
31 substrate layers of the second stiffening profile
41 stabilising layers of the first stiffening profile
42 stabilising layers of the second stiffening profile
100 fuselage component
200 aircraft
210 fuselage
211 outer skin of the fuselage
220 wing
230 elevator assembly
240 tailfin assembly
300 pressure head
310 nozzle
320 heating device
331, 332 feed portions
350 moving device
A arrow
C1 component transverse direction
F fibre bundle
G direction of gravitational force
h3 height of the second stiffening profile
L1 component longitudinal direction
l2 longitudinal extent of the first stiffening profile
l3 longitudinal extent of the second stiffening profile
P thermoplastic material
V2 first stiffening longitudinal direction
V3 second stiffening longitudinal direction

The invention claimed is:

1. A method for manufacturing a fuselage component for an aircraft using material extrusion, the method comprising:
   providing a two-dimensional shell part composed of a fibre composite material;
   building up of a first stiffening profile on a first surface of the shell part from a plurality of first layers superimposed on one another in a thickness direction (T), each formed by applying first filaments, which each comprise a fibre bundle embedded in a thermoplastic material, wherein the plurality of first layers are applied only along a first longitudinal stiffening direction;
   building up of a second stiffening profile, crossing the first stiffening profile at an intersection, on the first surface of the shell part from a plurality of second layers superimposed on one another in the thickness direction, each formed by applying second filaments, which each comprise a fibre bundle embedded in a thermoplastic material, wherein the plurality of second layers are applied only along a second longitudinal stiffening direction;
   forming, in the first stiffening profile and in the second stiffening profile, stabilising layers within which the filaments extend beyond the intersection, from the filaments.

2. The method according to claim 1, wherein the first and second filaments are applied by a pressure head, from which the thermoplastic material is extruded in a thermoplastic state coaxially with the corresponding first and second fibre bundles.

3. The method according to claim 2, wherein the thermoplastic material and the fibre bundles of the first and second filaments are each fed to the pressure head as ribbon-shaped or filamentary material.

4. The method according to claim 1, wherein the filaments of the stabilising layers are each applied over an entire longitudinal extent of the first and second stiffening profiles.

5. The method according to claim 1, wherein the second stiffening profile is built up to a greater height in the thickness direction than the first stiffening profile, and wherein at least one of the stabilising layers of the second stiffening profile in the thickness direction is formed in an area of the second stiffening profile situated above the first stiffening profile.

6. The method according to claim 1, wherein the first layers of the first stiffening profile and the second layers of the second stiffening profile are each formed alternately as stabilising layers in the thickness direction.

7. The method according to claim 1, wherein the first stiffening profile and/or the second stiffening profile is formed with a T-shaped, an I-shaped or an Ω-shaped cross section.

8. The method according to claim 1, wherein the shell part further comprises a thermoplastic matrix material.

* * * * *